United States Patent

Aitken et al.

(10) Patent No.: US 6,194,334 B1
(45) Date of Patent: Feb. 27, 2001

(54) TELLURITE GLASSES AND OPTICAL COMPONENTS

(75) Inventors: Bruce G. Aitken; Adam J. G. Ellison, both of Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/335,832

(22) Filed: Jun. 18, 1999

(51) Int. Cl.[7] .................................................... C03C 3/12
(52) U.S. Cl. .................................................. 501/41; 501/37
(58) Field of Search ....................... 501/41, 37; 359/341, 359/343

(56) References Cited

U.S. PATENT DOCUMENTS

| | | | |
|---|---|---|---|
| 2,763,559 | * 9/1956 | Weissenberg et al. | 501/41 |
| 3,291,620 | * 12/1966 | Evstropjev et al. | 501/41 |
| 3,661,600 | * 5/1972 | Izumitani et al. | 501/41 |
| 4,652,536 | * 3/1987 | Nakajima et al. | 501/41 |
| 4,732,875 | * 3/1988 | Sagara et al. | 501/41 |
| 5,093,288 | 3/1992 | Aitken et al. | 501/42 |
| 5,188,990 | 2/1993 | Dumesnil et al. | 501/19 |
| 5,251,062 | * 10/1993 | Snitzer et al. | 359/341 |
| 5,283,211 | 2/1994 | Aitken et al. | 501/41 |
| 5,283,212 | 2/1994 | Aitken et al. | 501/73 |
| 5,336,644 | 8/1994 | Akhtar et al. | 501/15 |
| 5,346,865 | 9/1994 | Aitken et al. | 501/40 |
| 5,668,659 | * 9/1997 | Sakamoto et al. | 359/341 |

FOREIGN PATENT DOCUMENTS

| | | |
|---|---|---|
| 71-0072881 | * 9/1971 | (JP) . |
| 79-003626 | * 2/1979 | (JP) . |
| 1308580 | * 5/1987 | (SU) . |
| 1313818 | * 5/1987 | (SU) . |

OTHER PUBLICATIONS

"Structure of Alkali and Alkaline Earth Zinc Tellurite Glasses" Dickinson, J.E. et al., *Proc. XVI Int. Congr. Glass* (1992) 277. (No Month).

"1.5 μm Broadband Amplification by Tellurite–Based EFGAs" Atsushi Mori et al., NTT Opto–Electronics Labs, NT&T Corp, *OFC 97 Postdeadline Papers*, Feb. pp. 16–21, 1997, pp. 1–4.

* cited by examiner

Primary Examiner—Mark L. Bell
Assistant Examiner—David Sample
(74) Attorney, Agent, or Firm—Milton M. Peterson

(57) ABSTRACT

A family of alkali-tungsten-tellurite glasses that consist essentially of, as calculated in mole percent, 10–90% $TeO_2$, at least 5% $WO_3$ and at least 0.5% $R_2O$ where R is Li, Na, K, Cs, Tl and mixtures, that may contain a lanthanide oxide as a dopant, in particular erbium oxide, and that, when so doped, is characterized by a fluorescent emission spectrum having a relatively broad FWHM value.

7 Claims, 3 Drawing Sheets

TELLURITE GLASSES AND OPTICAL COMPONENTS

FIELD OF THE INVENTION

Alkali-tungsten-tellurite glasses and their use in telecommunication system components.

BACKGROUND OF THE INVENTION

Optical components, in particular components employing optical fibers doped with rare earth metal ions, are widely used in telecommunication systems. A major application is in signal amplifiers which employ fluorescent ion emission for amplification of a signal. The ion emission occurs within the same operating wavelength region as the signals. Pump energy excites the rare earth metal ion causing it to fluoresce and thereby provide optical gain.

Glasses, doped with a rare earth metal ion and pumped with appropriate energy, exhibit a characteristic, fluorescence intensity peak. The evolution of telecommunication systems, with their increasing demands for bandwidth, has created a need for a rare-earth-doped, amplifier material having the broadest possible emission spectrum in the wavelength region of interest. It is a purpose of the present invention to meet this need.

The bandwidth of a fluorescent intensity curve is, rather arbitrarily, taken as the full width half maximum (FWHM) of the curve in nanometers wavelength. This value is the lateral width of the curve at one half the maximum intensity, that is, at one half the vertical height of the peak of the curve. Unfortunately, many glasses, that exhibit a fluorescence in an appropriate region, exhibit a rather narrow bandwidth. It is a further purpose of the invention to provide a family of glasses that exhibit a relatively broad bandwidth.

It is well known that glasses doped with erbium can be caused to emit fluorescence in the 1520–1560 nm. region. This enables a signal operating in this wavelength range to be amplified. The significance of the 1550 wavelength in optical communication has led to extensive studies regarding the behavior of erbium as a rare earth metal dopant in glasses. It has also led to the study of a variety of glasses as the host for the erbium ion.

The low phonon energy of tellurite glasses can lead to long emission lifetimes at certain pump wavelengths. As an example, erbium in tellurite glasses exhibits long tau-32 (980 emission) lifetimes relative to silicates. The long emission lifetimes at the pump wavelength can reduce the efficiency of an amplifier or laser because of excited state absorption. A practical 980 pumping scheme can be obtained by co-doping glasses with components having phonon overtones that are resonant with the energy difference between 980 and 1530 nm. Such components include $H_2O$, $B_2O_3$, $P_2O_5$.

For certain applications, long, erbium, tau-32 emission lifetime is desirable. These include long-band amplifiers, where pumping directly into the ground-state absorption does not impact noise figure; also tilt-free amplifiers, in which 980 and 1480 pump lasers are combined to dynamically adjust the gain without affecting the shape of the gain spectrum.

It is also known that glasses with moderately low maximum phonon energies, when doped with thulium, can display fluorescence in the vicinity of 1450 nm. Although this wavelength lies outside of the currently used telecommunications band, it still lies within the transparency window of most commercial optical fiber. With the ever-increasing demand for useful bandwidth, there will be a need for additional amplifier devices that operate over the remaining portions of this window that are not covered by erbium.

It is known, for example, that, as the concentration of a rare earth metal ion, such as erbium, is increased, the optical gain increases up to a certain point. Beyond this point, the fluorescent signal is quenched, and the optical gain decreases. This phenomenon is considered to result from the dopant, rare earth metal ions interacting with each other in a manner commonly referred to as clustering. It is another purpose of the invention to provide a family of glasses which is readily capable of dissolving erbium ions, and which exhibits a broad bandwidth indicating that clustering is inhibited.

It has been reported that certain tellurite glasses, doped with erbium ions, provide a very broad, erbium emission band in the 1540 nm. region of the spectrum. Glass compositions were not reported, but other studies indicate that the glasses are alkali-alkaline earth-zinc-tellurite glasses.

Most tellurite glass families require the presence of at least about 50% $TeO_2$ in the glass compositions to permit glass formation. It has been thought that a broader range of the glass forming oxide, $TeO_2$, should provide a variety of structural motifs of the network-forming $TeO_x$ species. Such species include polymerized, bipyramidal $TeO_4$ groups at high $TeO_2$ content and isolated pyramidal $TeO_3$ groups at low $TeO_2$ content. The diversity of species should yield a greater diversity of structural sites for the incorporation of dopant ions, such as erbium ions. This avoids the ions clustering and becoming ineffective for fluorescent emission and consequent amplification. Also, the diversity of dopant sites should give rise to broadened emission spectra.

It is, then, a basic purpose of the present invention to provide a family of tellurite glasses that can be melted over an extensive compositional region, and in which compounds of rare earth metals, such as erbium, are readily soluble.

SUMMARY OF THE INVENTION

The invention resides, in part, in a family of alkali-tungsten-tellurite glasses that consist essentially of, as calculated in mole percent, 10–90% $TeO_2$, at least 5% $WO_3$, and at least 5% $R_2O$, where R is Li, Na, K, Rb, Cs, Tl and mixtures.

The invention further resides in an optical component for a telecommunication system that is composed of an alkali-tungsten-tellurite glass that has a high thermal stability ($T_x$–$T_g$), that readily dissolves rare earth metal oxides and that has a composition consisting essentially of, as calculated in mole percent, 15–85% $TeO_2$, 5–55% $WO_3$, 0.5–40% $R_2O$, where R is Li, Na, K, Rb, Cs, Tl and mixtures, and 0.005–10% of an oxide in the lanthanide series.

BRIEF DESCRIPTION OF THE DRAWINGS

In the accompanying drawings.

DESCRIPTION OF THE INVENTION

Figure 1:
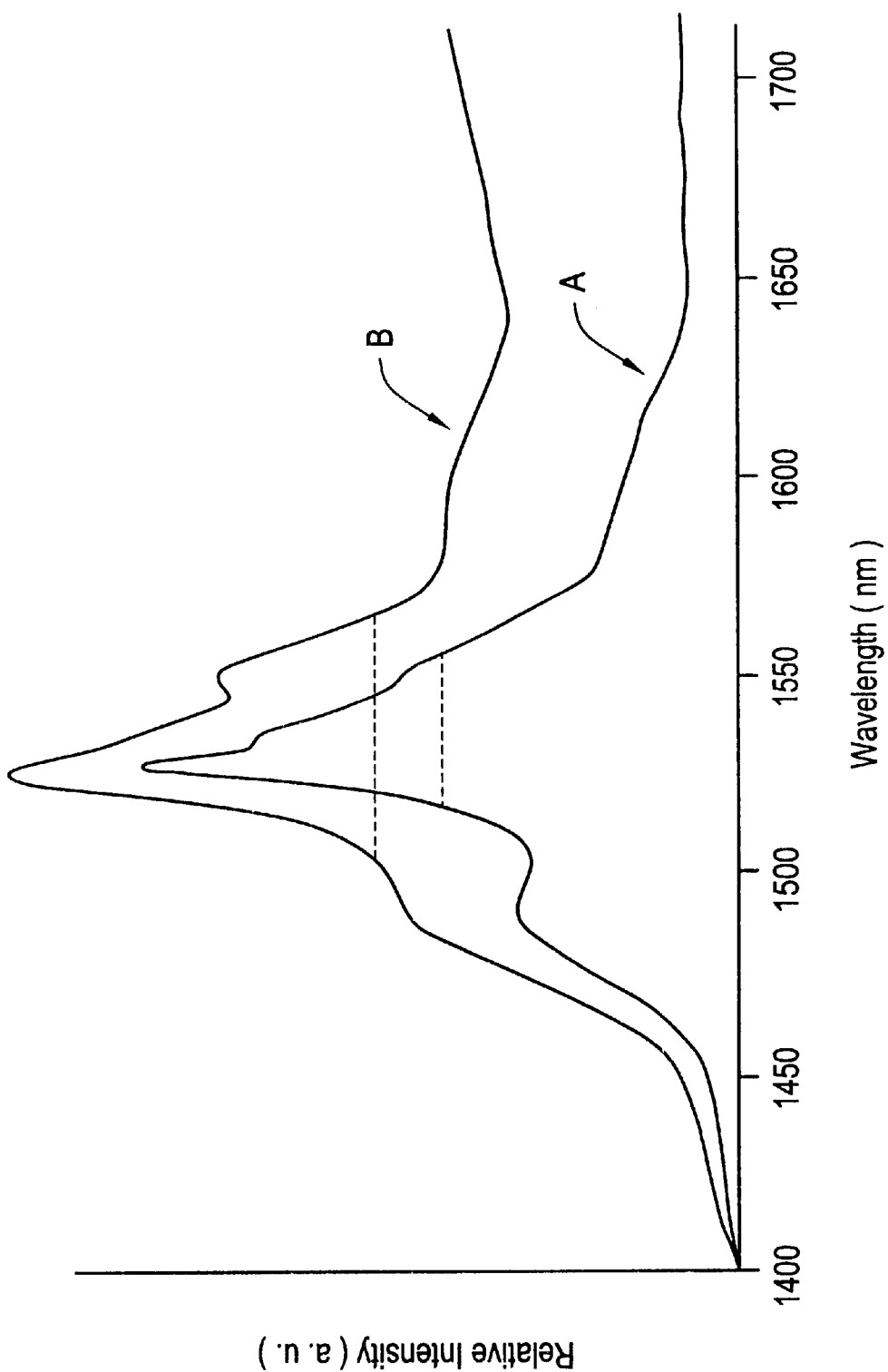
FIG. 1 is a graphical representation comparing the emission spectrum of a glass of the present invention and that of a corresponding prior glass.

It has been indicated earlier that known tellurite glass families generally require at least 50 mole percent $TeO_2$ in their composition. The present invention is based on discovery of an alkali-tungsten-tellurite glass family that has a much greater compositional region. Further, the glasses in this family are readily capable of dissolving rare earth metals as dopants. In particular, when these glasses are doped with an erbium compound, they exhibit broad emission features, that is, they exhibit a relatively large FWHM. This is especially significant for the commercially important 1.54 μm band. In addition, they provide other features that enhance their ability in producing optical materials, particularly fibers.

The alkali-tungsten-tellurite glasses are unique in that their TeO$_2$ content may range broadly from 10–90 mole percent. This broad range of possible TeO$_2$ contents offers the possibility of a concomitant variety of structural motifs of the network-forming TeO$_2$ species. As indicated earlier, these include polymerized, bipyramidal, TeO$_4$ groups when the glass has a high TeO$_2$ content. With a lower TeO$_2$ content, isolated pyramidal TeO$_3$ groups become possible. This variety of structural motifs yields a greater diversity of structural sites for incorporating dopant ions such as erbium ions (Er$^{+3}$). The consequence of this is an enhanced solution of effective erbium ions and broadened erbium emission spectra.

TABLE I sets forth the compositions in mole percent of representative alkali-tungsten-tellurite glasses in accordance with the invention. Also presented are FWHM values in nanometers and thermal stability index values for glasses having these compositions. For comparison purposes, a glass composition, having no tungsten content, is shown as example 5.

TABLE I

|  | 1 | 2 | 3 | 4 | 5 |
|---|---|---|---|---|---|
| Na$_2$O | 15 | 10 | 5 | 13 | 12 |
| K$_2$O | 15 | 10 | 5 | 13 | 12 |
| WO$_3$ | 45 | 30 | 15 | 39 | — |
| TeO$_2$ | 25 | 50 | 75 | 35 | 76 |
| Er$_2$O$_3$ | 0.05 | 0.05 | 0.05 | 0.05 | 0.05 |
| FWHM (nm) | 50 | 50 | 58 |  | 34 |
| T$_x$—T$_g$(° C.) | 127 | 134 | 143 | 142 | 108 |

These glasses may be utilized in bulk form for planar devices. However, it is contemplated that they will also be fabricated in the form of optical fibers. For the latter purpose, the thermal stability of the glass is an important consideration. Accordingly, a large value for the thermal stability index (T$_x$-T$_g$) is significant.

The thermal stability index is the temperature interval between a temperature (T$_x$) and the glass transition temperature (T$_g$). As used here, T$_x$ represents the temperature at the onset of crystal formation. Any development of crystals in the glass can be detrimental.

For drawing of fibers, an index value of at least 100° C. is desired. Such an index value, in view of the steepness of the viscosity curve for these glasses, is sufficient to permit fiberization of the glasses in a practical manner for example, by redrawing "rod-in-tube" preforms.

The property features of the inventive glasses are further described with reference to FIGS. 1 and 2.

FIG. 1 is a graphical representation comparing the emission spectrum of a tungsten-containing, tellurite glass with the emission spectrum of a tungsten-free, alkali tellurite glass. Relative emission intensity is plotted on the vertical axis in arbitrary units (a.u.) for comparison purposes. Wavelength in nanometers, is plotted on the horizontal axis.

Curve A represents the emission spectrum for a known alkali tellurite glass that contains no tungsten content in its composition. This glass has the composition of Example 5 in TABLE I. Curve B represents the emission spectrum for a typical, alkali-tungsten-tellurite glass of the present invention (Example 3). The dashed, lateral lines indicate the FWHM value for each glass. The flatter and broader character of Curve B, and the consequently greater FWHM value of the tungsten-containing glass, are apparent. This is a typical and significant feature of the present glasses.

Figure 2:
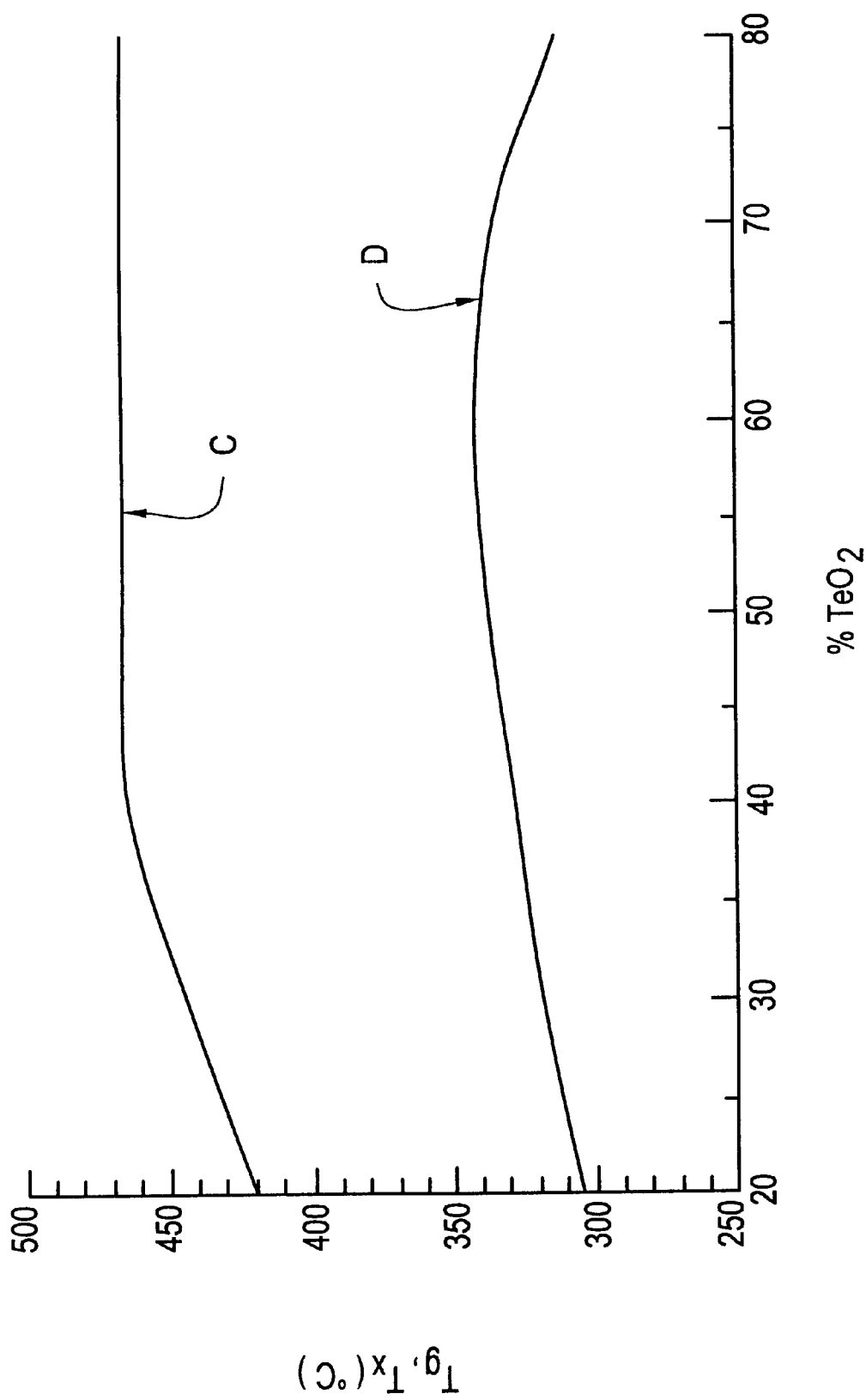
FIG. 2 is a graphical representation illustrating the thermal stability of a glass in accordance with the invention.

FIG. 2, also a graphical representation, illustrates the thermal stability in a typical alkali-tungsten-tellurite glass. In FIG. 2, temperature in °C. is plotted on the vertical axis, and TeO$_2$ content, in mole percent, in alkali-tungsten-tellurite glasses is plotted on the horizontal axis.

Curve C represents the T$_x$ temperatures in °C. for glasses having TeO$_2$ content varying from 20–80 mole percent. Curve D represents the glass transition temperatures (T$_g$) for the same glasses over the same TeO$_2$ content range.

It will be observed that the T$_g$ curve (Curve D), rises slowly to about 60% TeO$_2$ and then gradually descends a bit. The T$_x$ curve (Curve C) also rises to about 40% TeO$_2$ content; then levels off.

The significant feature is the vertical distance between the curves at any given content of TeO$_2$. It will be observed that this vertical difference (T$_x$-T$_g$) is about 125° C. at about 20% TeO$_2$ and grows to nearly 150° C. at high TeO$_2$ content. As indicated earlier, this is extremely important in avoiding devitrification problems during the drawing of fibers by any preform redraw technique.

In general, the basic glass family of the invention, that is, the undoped alkali-tungsten-tellurite glass family, consists essentially of, in mole percent, 10–90% TeO$_2$ and the remainder at least 0.005% R$_2$O, where R is Li, Na, K, Rb, Cs and/or Tl, and at least 5% WO$_3$. Within this broad composition range, a somewhat narrower range has characteristics that make the glasses particularly useful in the fabrication of clad fibers doped with erbium for amplification components. The base glass compositions for this purpose, consist essentially of, as calculated in mole percent, 15–85% TeO$_2$, 5–55% WO$_3$, and 0.5–40% R$_2$O, where R indicates the elements recited above. In addition, the base glass will contain 0.005–10% of an oxide of a rare earth metal in the lanthanide series, including erbium.

The base glass compositions may be modified to alter the physical properties of glasses having these compositions. In particular, they may be modified for the purpose of providing combinations of core and cladding glasses for an optical fiber. For that purpose, the glasses must exhibit a difference in refractive indices as is well known. Otherwise, however, it is desirable that the core and cladding glasses have properties as near identical as possible.

The modifying oxides may include 0–30% MO where M is Mg, Ca, Sr, Ba, Zn, Cd, Pb, Y, La, Gd, Lu, Ti, Zr, Hf, Nb, Ta, Bi, H, B and/or P.

More particularly, glass compositions may be modified by the addition of 0–30% MO wherein M is Mg, Ca, Sr, Ba, Zn and/or Pb, 0–20% Y$_2$O$_3$ and/or Sb$_2$O$_3$, and/or 0–15% TiO$_2$, Nb$_2$O$_5$ and/or Ta$_2$O$_5$. These additions are particularly useful in developing core/cladding compositions appropriate for clad fiber production.

The various oxide constituents can be partially replaced by the corresponding metal halides in amounts such that the total halogen content may be up to about 25% of the total halogen plus oxygen content of the composition. Also, the ratio of R$_2$O to WO$_3$ is kept above 1:3, preferably 9:20. This avoids the reduction of $W^{+6}$ to a lower oxidation state that could introduce sources of attenuation in fibers.

The lightweight elements, hydrogen, boron and phosphorous, are desirable as oxide additives in the present glasses. This is because of their favorable influence on dopant ion lifetimes, particularly where erbium is the dopant ion. As a matter of practical economics in optical amplifier services, it is customary to pump erbium with a laser operative at 980 nm. This poses a potential problem, since the laser pumps the ions to a level, commonly referred to as level 3, that is above the actual fluorescing level.

The effective fluorescent radiation for amplification of a signal at 1.5 $\mu$m emanates from an intermediate level known as level 2. The ground state, to which ions return after they fluoresce, is referred to as level 1. Most effective amplification at 1.5 $\mu$m is achieved by maximizing radiative output at intermediate level 2. To this end, it is desirable to control the ion lifetime of both levels 2 and 3.

Tau-32, that is, the lifetime of an ion at level 3 before decaying to level 2, should be as short as possible. This short lifetime avoids undesirable pump power losses due to upconversion. In contrast, tau-21, that is, the effective lifetime at level 2 before decaying to the ground state (level 1), should be as long as possible.

In general, however, any means of shortening tau-32 also tends to shorten tau-21 as well. It has now been found that this general rule, for some reason not understood, does not hold true in the present, erbium-doped, alkali-metal-tungsten-tellurite glasses. This is shown in TABLE II, below.

In TABLE II, Example 6 is identical to Example 3 of TABLE I, that is, has no additive co-dopant. Examples 7–10 contain varying amounts of $PO_{2.5}$ as co-dopant, and Examples 11–14, likewise, contain varying amounts of $BO_{1.5}$ as co-dopant. The co-dopant, and the amount added in each example, is shown in the second column as the oxide in cation percent. In column 3, the fluorescence lifetime of level 3, that is, tau-32, is recorded for each composition in microseconds ($\mu$s). Likewise, column 4 records the fluorescence lifetime of level 2, that is, tau-21, for each composition in milliseconds (ms). The values in column 4 may be multiplied by a thousand for direct comparison in microseconds.

TABLE II

| Example | Co-Dopant | Tau-32 ($\mu$s) | Tau-21 (ms) |
| --- | --- | --- | --- |
| 6 | none | 92 | 3.57 |
| 7 | 1 $PO_{2.5}$ | 62 | 3.78 |
| 8 | 2 $PO_{2.5}$ | 37 | 3.69 |
| 9 | 4 $PO_{2.5}$ | 20 | 4.02 |
| 10 | 6 $PO_{2.5}$ | 13 | 3.95 |
| 11 | 1 $BO_{1.5}$ | 78 | 4.06 |
| 12 | 2 $BO_{1.5}$ | 55 | 3.67 |
| 13 | 4 $BO_{1.5}$ | 46 | 3.59 |
| 14 | 6 $BO_{1.5}$ | 38 | 3.82 |

Figure 3:
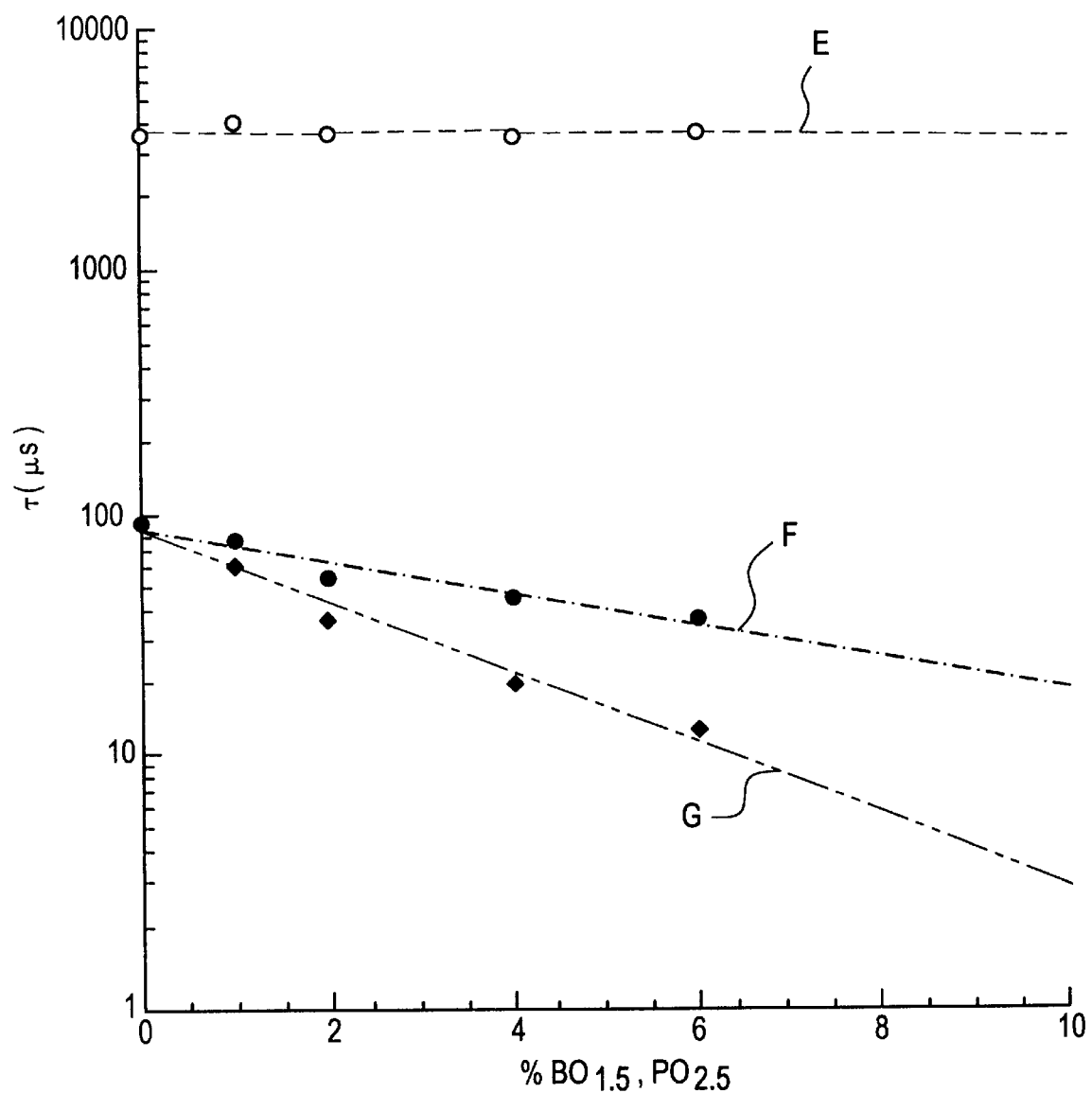
FIG. 3 is a graphical representation illustrating the effect of certain co-dopants on fluorescence lifetimes of erbium ions in the present glasses.

The uniquely different effect on tau-32 and tau-21 lifetimes exhibited by the present glasses may also be seen in FIG. 3. There, the amount of either $BO_{1.5}$ or $PO_{2.5}$, added as co-dopant, is plotted on the horizontal axis in cation percent. The tau-32 and tau-21 values are plotted on the vertical axis. Both values are plotted in microseconds ($\mu$s), employing a logarithmic scale, for direct comparison.

The essentially straight line, designated E, represents tau-21 for both boron and phosphorous, co-doped compositions. The plotted points were so close that drawing separate lines was not feasible. Straight lines, designated by the letters F and G, represent tau-32 for boron and phosphorous, co-doped compositions, respectively.

It will be observed that tau-21, shown by line E, remains essentially constant, rather than decreasing, with increasing amounts of either co-dopant. At the same time, tau-32, shown by lines F and G, decreases rapidly, as is desired, with increasing amounts of either co-dopant.

Tellurite glasses, having compositions as shown in TABLE I, were melted by first mixing a batch in customary manner. The tellurium, tungsten and lanthanide components were introduced as oxides. The alkali metal oxides were introduced as either the nitrate or the carbonate. The batch was manually mixed and placed in a 96% silica, or a gold, crucible. The crucible was introduced into an electric furnace operating at 750° C. to melt the batch. Melting time was on the order of 30–60 minutes. The glass thus produced was annealed at a temperature near the transition temperature ($T_g$) of the glass.

We claim:

1. A family of glasses that have a thermal stability index ($T_x-T_g$) of at least 100° C., that have an emission spectrum with a FWHM bandwidth of at least 40 nm., and that have compositions consisting essentially of, as calculated in mole percent, 15–85% $TeO_2$, 5–55% $WO_3$, 0.5–40% $R_2O$ where Na, K, or mixtures, and 0.005–10% of an oxide of a rare earth metal ion in the lanthanide series that is capable of fluorescing when pumped with appropriate energy.

2. A family of glasses in accordance with claim 1 wherein the oxide in the lanthanide series is erbium oxide or thulium oxide.

3. A family of glasses in accordance with claim 1 containing one or more optional, modifying components of MO wherein M is one or more of Ca, Sr, Ba, Mg, Zn, Cd, Pb, Y, Sb, La, Gd, Lu, Ti, Zr, Hf, Nb, Ta, Bi, H, B and P.

4. A family of glasses in accordance with claim 3 containing at least one optional, modifying component selected from 0–30% MO where M is an oxide of Mg, Ca, Sr, Ba, Zn, Cd and/or Pb, 0–20% $Y_2O_3$ and/or $Sb_2O_3$ and 0–15% $TiO_2$, $Nb_2O_3$ and/or $Ta_2O_5$.

5. A family of glasses in accordance with claim 3 wherein a portion of the metal oxides are replaced by metal halides providing that the atomic ratio of the total halide content to the total halide content plus oxygen content of the glass is not over 1:4.

6. A family of glasses in accordance with claim 1 wherein the ratio of total $R_2O:WO_3$ is at least about 1:3.

7. A family of glasses in accordance with claim 3 containing a lightweight element selected from B, H, P and mixtures to shorten the tau-32 lifetime of a fluorescing ion.

* * * * *